United States Patent
Gudivada et al.

(10) Patent No.: US 10,972,902 B1
(45) Date of Patent: Apr. 6, 2021

(54) MANAGING CONCURRENT ACCESS TO UNIVERSAL INTEGRATED CIRCUIT CARDS

(71) Applicant: QUALCOMM Incorporated, San Diego, CA (US)

(72) Inventors: Naga Chandan Babu Gudivada, Hyderabad (IN); Venkata Konda Reddy Reddem, Hyderabad (IN); Rajendra Prasad Nelurouth, Hyderabad (IN); Phani Pradeep Kumar Kothapalli Venkata, Hyderabad (IN); Venkata Durga Vinod Chikkala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/586,495

(22) Filed: Sep. 27, 2019

(51) Int. Cl.
| | |
|---|---|
| H04W 8/18 | (2009.01) |
| H04W 8/20 | (2009.01) |
| H04W 4/50 | (2018.01) |
| H04B 7/26 | (2006.01) |
| H04W 4/14 | (2009.01) |
| H04W 88/02 | (2009.01) |

(52) U.S. Cl.
CPC .......... *H04W 8/183* (2013.01); *H04B 7/2668* (2013.01); *H04W 4/14* (2013.01); *H04W 4/50* (2018.02); *H04W 8/205* (2013.01); *H04W 88/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0249658 | A1* | 10/2011 | Wohlert | H04L 65/1069 370/338 |
| 2012/0106533 | A1* | 5/2012 | Chen | H04W 4/50 370/342 |
| 2012/0252493 | A1* | 10/2012 | Siddeley | H04W 4/025 455/456.2 |

(Continued)

OTHER PUBLICATIONS

GSM Association Non-confidential Official Document SGP.02—Remote Provisioning Architecture for Embedded UICC Technical Specification: "Remote Provisioning Architecture for Embedded UICC Technical Specification Version 3.0", Security Classification: Non-confidential GSM Association Non-confidential Remote Provision, Jun. 30, 2015 (Jun. 30, 2015), XP055754403, pp. 1-301, Retrieved from the Internet: URL: https://www.gsma.com/iot/wp-content/uploads/2012/03/SGP-02-v3-0.Pdf [retrieved on Nov. 26, 2020] p. 71, paragraph 3.15.2, p. 260, Paragraph B.1.

(Continued)

*Primary Examiner* — Ankur Jain

(57) ABSTRACT

Various aspects of the present disclosure generally relate to wireless communication. In some aspects, a user equipment (UE) may identify an ongoing operation associated with a file of a universal integrated circuit card coupled to the UE. The UE may identify a request to access the file during the ongoing operation. The UE may suspend the request to access the file during the ongoing operation. The UE may process the request to access the file after completion of the ongoing operation. Numerous other aspects are provided.

32 Claims, 7 Drawing Sheets

(56) References Cited

U.S. PATENT DOCUMENTS

| | | | |
|---|---|---|---|
| 2013/0344857 A1* | 12/2013 | Berionne | H04W 88/02 |
| | | | 455/418 |
| 2014/0220949 A1 | 8/2014 | Ganesh et al. | |
| 2016/0150400 A1* | 5/2016 | Cha | G06F 1/1637 |
| | | | 455/418 |
| 2016/0241537 A1* | 8/2016 | Cha | G06F 21/31 |
| 2017/0156051 A1* | 6/2017 | Park | H04W 4/80 |
| 2018/0249322 A1 | 8/2018 | Kim et al. | |

OTHER PUBLICATIONS

International Search Report and Written Opinion—PCT/US2020/052285—ISA/EPO—dated Dec. 11, 2020.

* cited by examiner

MANAGING CONCURRENT ACCESS TO UNIVERSAL INTEGRATED CIRCUIT CARDS

FIELD OF THE DISCLOSURE

Aspects of the present disclosure generally relate to wireless communication and to techniques and apparatuses for managing concurrent access to a universal integrated circuit card (UICC).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different UE to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

In some wireless communication systems, a UE may be coupled to a universal integrated circuit card (UICC) to facilitate communications according to the above multiple access technologies.

SUMMARY

In some aspects, a method of wireless communication, performed by a user equipment (UE), may include identifying an ongoing operation associated with a file of a universal integrated circuit card (UICC) coupled to the UE; identifying a request to access the file during the ongoing operation; suspending the request to access the file during the ongoing operation; and processing the request to access the file after completion of the ongoing operation.

In some aspects, a UE for wireless communication may include memory and one or more processors operatively coupled to the memory. The memory and the one or more processors may be configured to identify an ongoing operation associated with a file of a UICC coupled to the UE; identify a request to access the file during the ongoing operation; suspend the request to access the file during the ongoing operation; and process the request to access the file after completion of the ongoing operation.

In some aspects, a non-transitory computer-readable medium may store one or more instructions for wireless communication. The one or more instructions, when executed by one or more processors of a UE, may cause the one or more processors to: identify an ongoing operation associated with a file of a UICC coupled to the UE; identify a request to access the file during the ongoing operation; suspend the request to access the file during the ongoing operation; and process the request to access the file after completion of the ongoing operation.

In some aspects, an apparatus for wireless communication may include means for identifying an ongoing operation associated with a file of a UICC coupled to the apparatus; means for identifying a request to access the file during the ongoing operation; means for suspending the request to access the file during the ongoing operation; and means for processing the request to access the file after completion of the ongoing operation.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
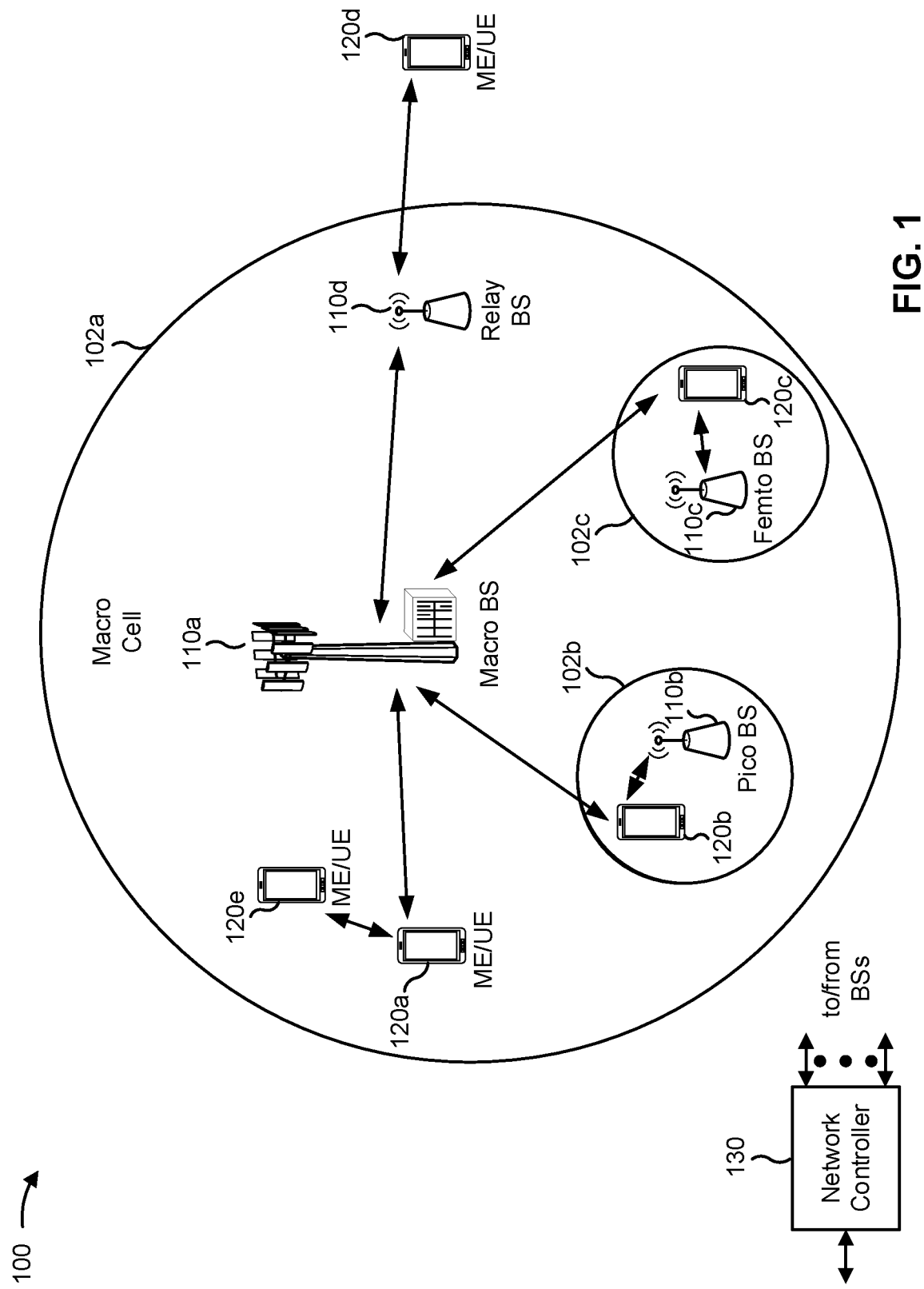
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. In some aspects, a UE may be a mobile equipment (ME). A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

A UE 120 may be associated with a subscriber identity module (SIM) or a universal subscriber identity module (USIM). For example, the SIM or USIM may include an application that may run on a SIM card or a universal integrated circuit card (UICC), which may be coupled to the UE 120. In some aspects, the SIM card or the UICC may be swappable. In some aspects, the SIM card or the UICC may not be easily swappable (e.g., may be soldered to the UE 120). In such a case, the SIM card or the UICC may be referred to as an embedded SIM (eSIM) card or an embedded UICC (eUICC), respectively. The SIM or USIM may store or provide user-specific data, such as a phone number, a user identifier, a device identifier, a home network identity, security information, and/or the like. Some SIMs or USIMs may provide more advanced functionality, such as phonebook functionality, dialing functionality, and/or the like. In some aspects, a UE, for example, may use a UICC. In some aspects, a UE, for example, may use a SIM card. However, for techniques and apparatuses described herein, any reference to a UICC is inclusive of a SIM card and any reference to a SIM card is inclusive of a UICC. In other words, techniques and apparatuses described herein are equally applicable to UICCs, eUICCs, SIM cards, eSIM cards, SIMs, and USIMs of MEs and/or of UEs.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
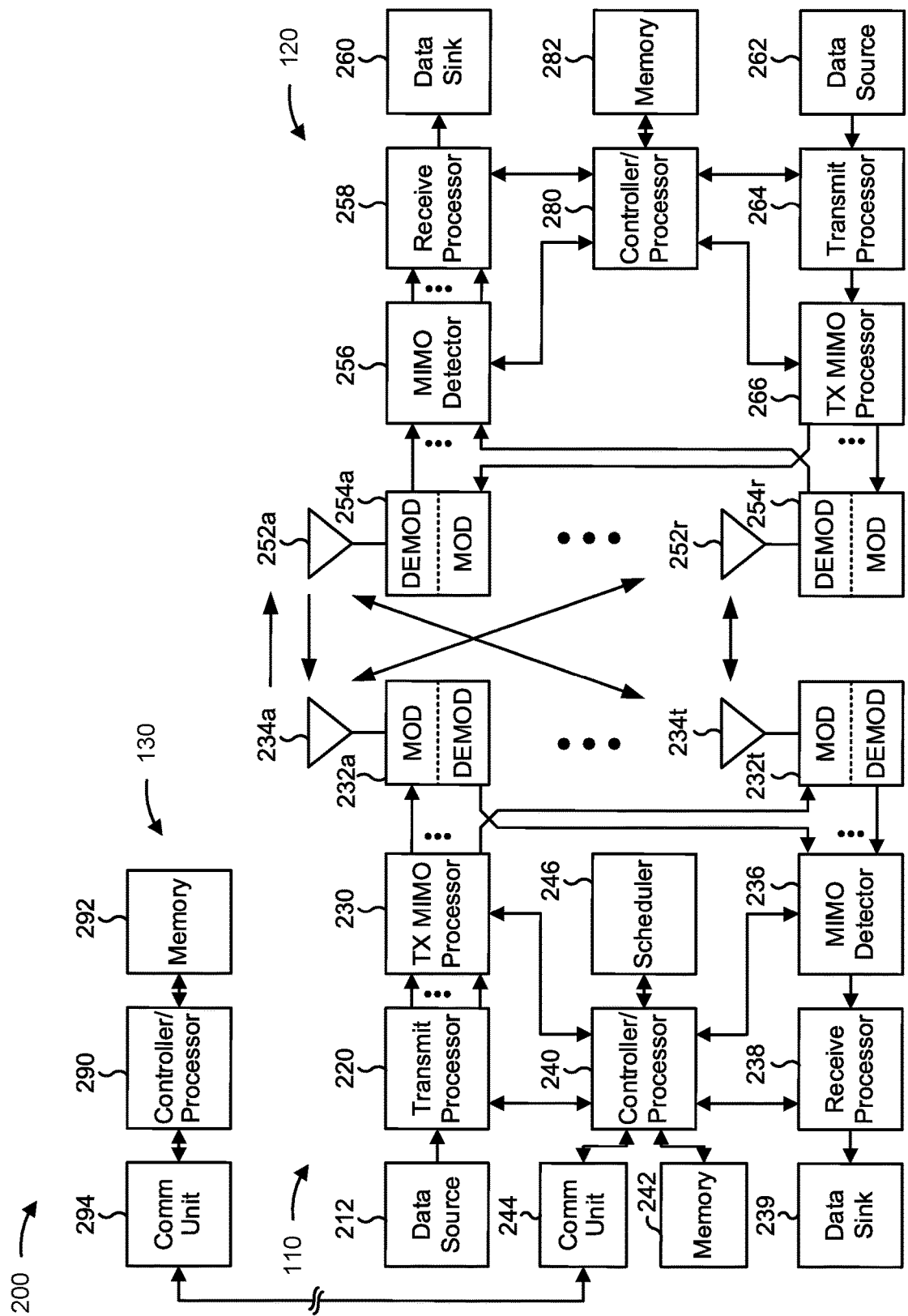
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with managing concurrent access to a UICC, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 may include means for identifying an ongoing operation associated with a file of a UICC coupled to the UE 120, means for identifying a request to access the file during the ongoing operation, means for suspending the request to access the file during the ongoing operation, means for processing the request to access the file after completion of the ongoing operation, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

A UE may be associated with a UICC. The UICC may implement one or more applications that facilitate interaction between the UE and one or more wireless communication systems. Accordingly, an application of the UICC may be designed to operate in accordance with requirements of multiple different wireless communication systems. Moreover, the application of the UICC may be designed to operate with multiple different UEs (e.g., chipsets of the multiple different UEs). In some cases, due to varying requirements of different wireless communication systems and/or differently configured UEs, a UICC may produce inconsistent or unexpected behavior for a particular UE that is connected to a particular wireless communication system. For example, a UICC update operation performed by a wireless communication system may fail or result in lost data when the UICC is simultaneously accessed by the UE for a read and/or a write operation.

Techniques and apparatuses described herein provide for management of concurrent access to a UICC. For example, during an ongoing operation associated with a file of the UICC, a request to read the file may be suspended until completion of the ongoing operation. Furthermore, during an ongoing operation associated with a file of the UICC, a request to write to the file may be denied. In this way, simultaneous access to a file of the UICC may be avoided, thereby facilitating successful completion of the ongoing operation and improving performance of the UE.

Figure 3:
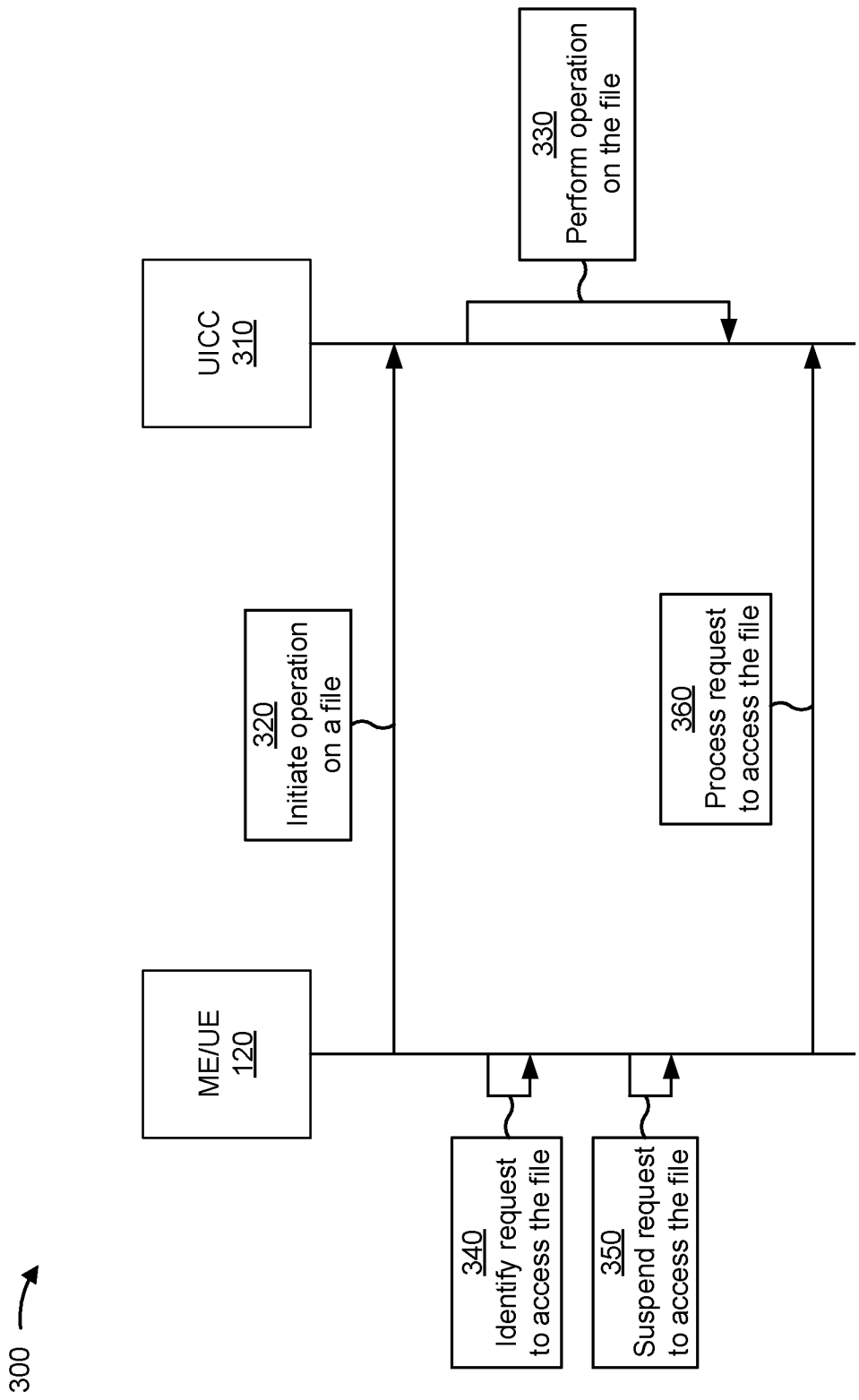
FIG. 3 is a diagram illustrating an example of managing concurrent access to a universal integrated circuit card (UICC), in accordance with various aspects of the present disclosure.

FIG. 3 is a diagram illustrating an example 300 of managing concurrent access to a UICC, in accordance with various aspects of the present disclosure. As shown in FIG. 3, a UE 120 and a UICC 310 may perform operations associated with access to a file on the UICC 310. The UICC 310 may be associated with the UE 120. For example, the UICC 310 may be coupled to the UE 120. Although the example 300 is described in terms of the UICC 310, the example 300 may be equally applicable to an eUICC, a SIM card, an eSIM card, and/or the like.

As shown in FIG. 3, and by reference number 320, the UE 120 may initiate an operation on a file of the UICC 310 (e.g., a file stored in a memory of the UICC 310). In some aspects, the UE 120 may initiate the operation upon receiving a short message service-point-to-point (SMS-PP) message (e.g., an Envelope(SMS-PP) message). For example, the UE 120 may receive the SMS-PP message from a base station of a wireless communication system. The SMS-PP message may direct that the operation on the file is to be performed. Accordingly, the operation on the file may be part of an SMS-PP procedure (e.g., an Envelope(SMS-PP) procedure). In some aspects, the UE 120 may initiate the operation by initiating a bearer independent protocol (BIP) session with a network (e.g., a base station of a wireless communication system). Accordingly, the operation on the file may be part of a BIP session.

As shown by reference number 330, the UICC 310 may perform the operation on the file. In some aspects, the operation on the file is an update operation of the UICC 310. For example, a network (e.g., a wireless communication system) may direct an update to a file of the UICC 310 in connection with an SMS-PP procedure or a BIP session. In some aspects, the file may be a non-shareable file of the UICC 310, such as an elementary file. For example, the file may be a multimode location association priority list (MLPL) file of the UICC 310. In some aspects, the file may identify a roaming wireless communication system for the UE 120 (e.g., the update operation may update a roaming wireless communication system for the UE 120).

As shown by reference number 340, while the operation on the file is ongoing, the UE 120 may identify a request to access the file. The request to access the file may originate from a process (e.g., an application) executing on the UE 120. In some aspects, the process may be associated with a modem of the UE 120 and/or an operating system of the UE 120. For example, the process may be an access stratum process, a non-access stratum process, a messaging application, a call management application, a contact management application, and/or the like.

In some aspects, the request to access the file may be a read request. For example, while the operation on the file is ongoing, the UE 120 may identify a request to read the file from a process executing on the UE 120. In some aspects, the request to access the file may be a write request. For example, while the operation on the file is ongoing, the UE 120 may identify a request to write to the file (e.g., read the file and write to the file) from a process executing on the UE 120.

As shown by reference number 350, while the operation on the file is ongoing, the UE 120 may suspend, which may include queueing or denying, the request to access the file. For example, while the operation on the file is ongoing, the UE 120 may suspend a request to read the file. In such a case, the UE 120 may suspend the request to read the file by holding the request in a queue of requests received while the operation on the file is ongoing. The UE 120 may suspend the request to read the file such that the request to read the file is not provided to the UICC 310 while the operation on the file is ongoing. In aspects in which the request to access the file is a request to write to the file, the UE 120 may deny the request. The UE 120 may deny the request to write to the file such that the request to write to the file is not provided to the UICC 310. In this way, concurrent access to the file during the operation is prevented, thereby improving the stability and functionality of the UE 120.

As shown by reference number 360, after completion of the operation on the file, the UE 120 may process the request to access the file. In some aspects, the completion of the operation may coincide with, or may be, completion of an SMS-PP procedure (e.g., an Envelope(SMS-PP) procedure) that includes the operation. In some aspects, the completion of the operation may coincide with, or may be, completion of a BIP session that includes the operation.

In some aspects, after completion of the operation on the file, the UE 120 may process a request to read the file (e.g., a request to read the file that was identified while the operation on the file was ongoing). In some aspects, after completion of the operation, the UE 120 may process a queue of requests to read the file (e.g., requests to read the file that were identified while the operation on the file was ongoing). For example, the UE 120 may process the queue in an order in which the requests to read the file were identified. The UE 120 may process a request to read the file by providing the request to the UICC 310. Accordingly, upon receiving the request to read the file, the UICC 310 may provide read access to the file (e.g., to the process of the UE 120 that generated the request to read the file).

In some aspects, after completion of the operation on the file, the UE 120 may permit requests to write to the file. Thus, the UE 120 may process a request to write to the file that was previously denied and has been retransmitted by a process of the UE 120.

In some aspects, after completion of the operation on the file, the UE 120 may process the request to access the file after a time interval. For example, after completion of the operation on the file, the UICC 310 may initiate a refresh procedure (e.g., a file change notification procedure) that includes the file, and the UE 120 may process a request to read the file (e.g., a request to read the file that was identified while the operation on the file was ongoing) after the refresh procedure has concluded. Thus, the time interval may allow for the refresh procedure of the UICC 310 to conclude before the UE 120 processes the request to read the file. In some aspects, the UE 120 may initiate a timer after completion of the operation on the file, and may process a request to read the file (e.g., a request to read the file that was identified while the operation on the file was ongoing) after expiration of the timer. The timer may be a configurable timer, such as a hysteresis timer.

In some aspects, after the time interval (e.g., after expiration of the timer), the UE 120 may determine whether the refresh procedure has concluded. For example, the UE 120 may determine that the refresh procedure has concluded based at least in part on a refresh completion response and/or a SIM initialization completion response from the UICC 310. Based at least in part on a determination that the refresh procedure has concluded, the UE 120 may process the request to read the file. In some aspects, the UE 120 may determine that the refresh procedure has not concluded and may restart the timer prior to processing the request to read the file.

In some aspects, the UE 120 may identify a request to access a file while a refresh procedure of the UICC 310 is ongoing (e.g., after completion of the operation on the file). For example, the UE 120 may identify a request to access the file, as described above, and may identify that a refresh procedure of the UICC 310 has been initiated (e.g., a refresh procedure has been initiated and confirmation for the refresh procedure has not been received from a process executing on the UE 120). In such a case, the UE 120 may determine whether the file is included in the refresh procedure of the UICC 310 (e.g., by referencing a list of files included in the refresh procedure).

In some aspects, the UE 120 may determine that the file is not included in the refresh procedure and may process the request to access the file (e.g., a request to read the file and/or a request to write to the file), as described above. In some aspects, the UE 120 may determine that the file is included in the refresh procedure and may suspend a request to access the file, as described above, while the refresh procedure is ongoing. Accordingly, the UE 120 may hold the request to access the file in a queue of requests received while the refresh procedure is ongoing, and may process the request to access the file after the refresh procedure has concluded. For example, the UE 120 may suspend the request to access the file and process the request to access the file upon expiration of a timer that was initiated after completion of the operation, as described above. In some aspects, the UE 120 may deny a request to write to the file, as described above, while the refresh procedure is ongoing.

In this way, access to a file during a refresh procedure of the UICC 310 is prevented, thereby improving data preservation on the UICC 310 and facilitating the creation of valid file location information.

As indicated above, FIG. 3 is provided as an example. Other examples may differ from what is described with respect to FIG. 3.

Figure 4:
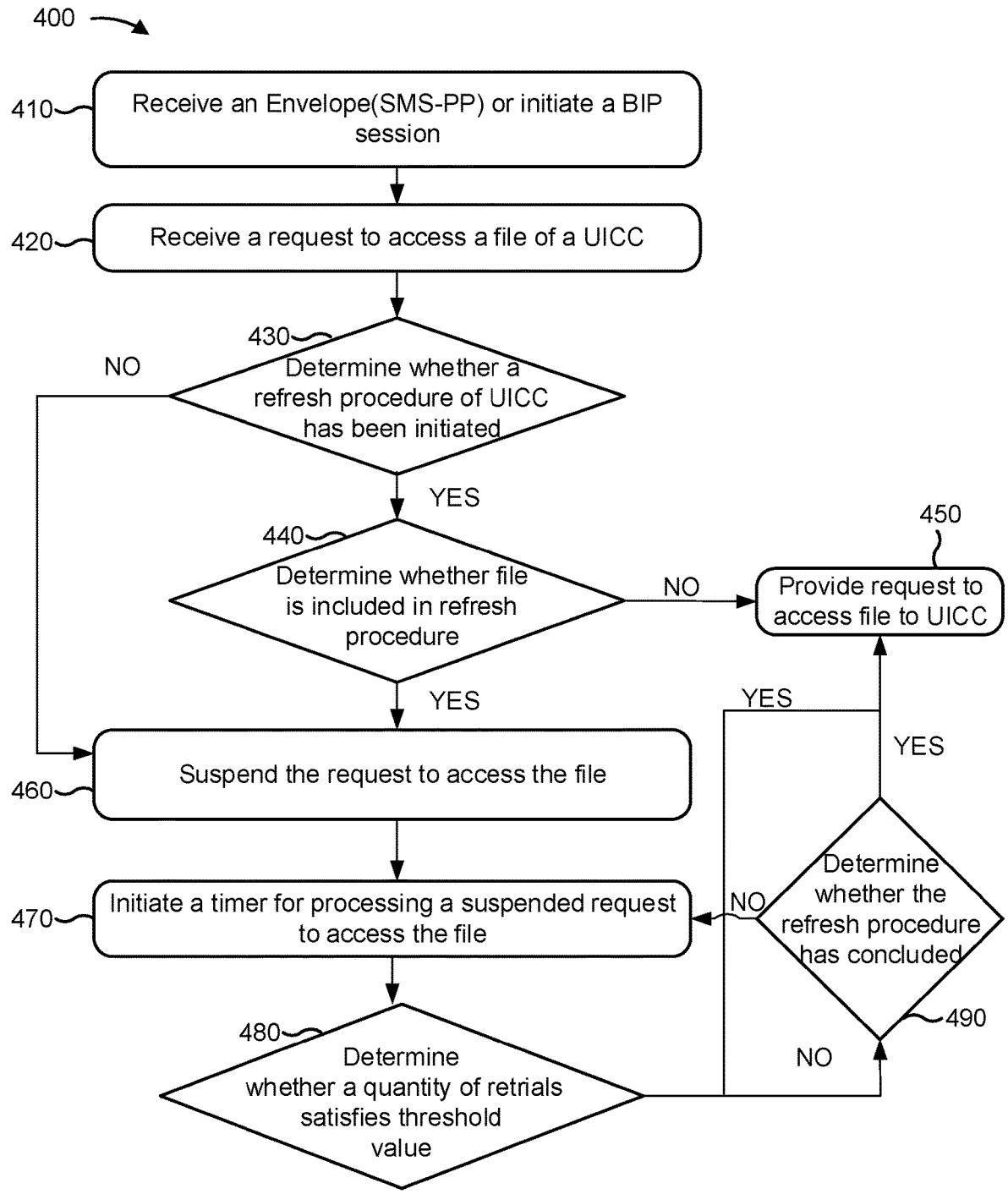
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with managing concurrent access to a UICC.

As shown in FIG. 4, in some aspects, process 400 may include receiving an Envelope(SMS-PP) or initiating a BIP session (block 410). For example, the UE (e.g., using antenna 252, DEMOD 254, MIMO detector 256, receive processor 258, controller/processor 280, and/or the like) may receive an Envelope(SMS-PP) or initiate a BIP session, as described above in connection with FIG. 3. In some aspects, the Envelope(SMS-PP) may cause, or the BIP session may include, an operation (e.g., an update operation) on a file of a UICC (e.g., a UICC coupled to the UE).

As further shown in FIG. 4, in some aspects, process 400 may include receiving a request to access the file of the UICC (block 420). For example, the UE (e.g., using antenna 252, DEMOD 254, MIMO detector 256, receive processor 258, controller/processor 280, and/or the like) may receive a request to access the file of the UICC, as described above in connection with FIG. 3. In some aspects, the request to access the file may be received by a modem of the UE.

As further shown in FIG. 4, in some aspects, process 400 may include determining whether a refresh procedure of the UICC has been initiated (block 430). For example, the UE (e.g., using controller/processor 280 and/or the like) may determine whether a refresh procedure of the UICC has been initiated, as described above in connection with FIG. 3. In some aspects, the refresh procedure may include the file of the UICC. For example, the refresh procedure may include the file of the UICC when an update to the file has occurred.

As further shown in FIG. 4, if the refresh procedure is determined to have been initiated (block 430—YES), then process 400 may include determining whether the file is included in the refresh procedure (block 440). For example, the UE (e.g., using controller/processor 280 and/or the like) may determine whether the file is included in the refresh procedure, as described above in connection with FIG. 3. In some aspects, the file may be included in the refresh procedure when the file is included in a list of files associated with the refresh procedure.

As further shown in FIG. 4, if the file is determined not to be included in the refresh procedure (block 440—NO), then process 400 may include providing the request to access the file to the UICC (block 450). For example, the UE (e.g., using controller/processor 280 and/or the like) may provide the request to access the file to the UICC, as described above in connection with FIG. 3.

As further shown in FIG. 4, if the file is determined to be included in the refresh procedure (block 440—YES), then process 400 may include suspending the request to access the file (block 460). Similarly, as further shown in FIG. 4, if the refresh procedure is determined not to have been initiated (block 430—NO), then process 400 may include proceeding to block 460. For example, the UE (e.g., using controller/processor 280, memory 282, and/or the like) may suspend the request to access the file, as described above in connection with FIG. 3. In some aspects, suspending the request may include queueing the request when the request is to read the file. In some aspects, suspending the request may include denying the request when the request is to write to the file.

As further shown in FIG. 4, in some aspects, process 400 may include initiating a timer for processing a suspended request to access the file (block 470). For example, the UE (e.g., using controller/processor 280 and/or the like) may initiate a timer for processing a suspended request to access the file. In some aspects, the timer may be a hysteresis timer.

As further shown in FIG. 4, in some aspects, process 400 may include determining whether a quantity of retrials satisfies a threshold value (block 480). In other words, when the timer expires, process 400 may include determining whether a quantity of retrials for determining whether the refresh procedure has concluded satisfies a threshold value. For example, the UE (e.g., using controller/processor 280 and/or the like) may determine whether the quantity of retrials satisfies a threshold value, as described above in connection with FIG. 3.

As further shown in FIG. 4, if the timer is determined to be expired and the quantity of retrials for determining whether the refresh procedure has concluded is determined to satisfy the threshold value (block 480—YES), then process 400 may include proceeding to block 450. As further shown in FIG. 4, if the timer is determined not to be expired or the quantity of retrials for determining whether the refresh procedure has concluded is determined not to satisfy the threshold value (block 480—NO), then process 400 may include determining whether the refresh procedure has concluded (block 490). For example, the UE (e.g., using controller/processor 280 and/or the like) may determine whether the refresh procedure has concluded, as described above in connection with FIG. 3.

As further shown in FIG. 4, if the refresh procedure is determined to have concluded, then process 400 may include proceeding to block 450. As further shown in FIG. 4, if the refresh procedure is determined not to have concluded, then process 400 may include returning to block 470.

As indicated above, FIG. 4 is provided as an example. Other examples may differ from what is described with respect to FIG. 4.

Figure 5:
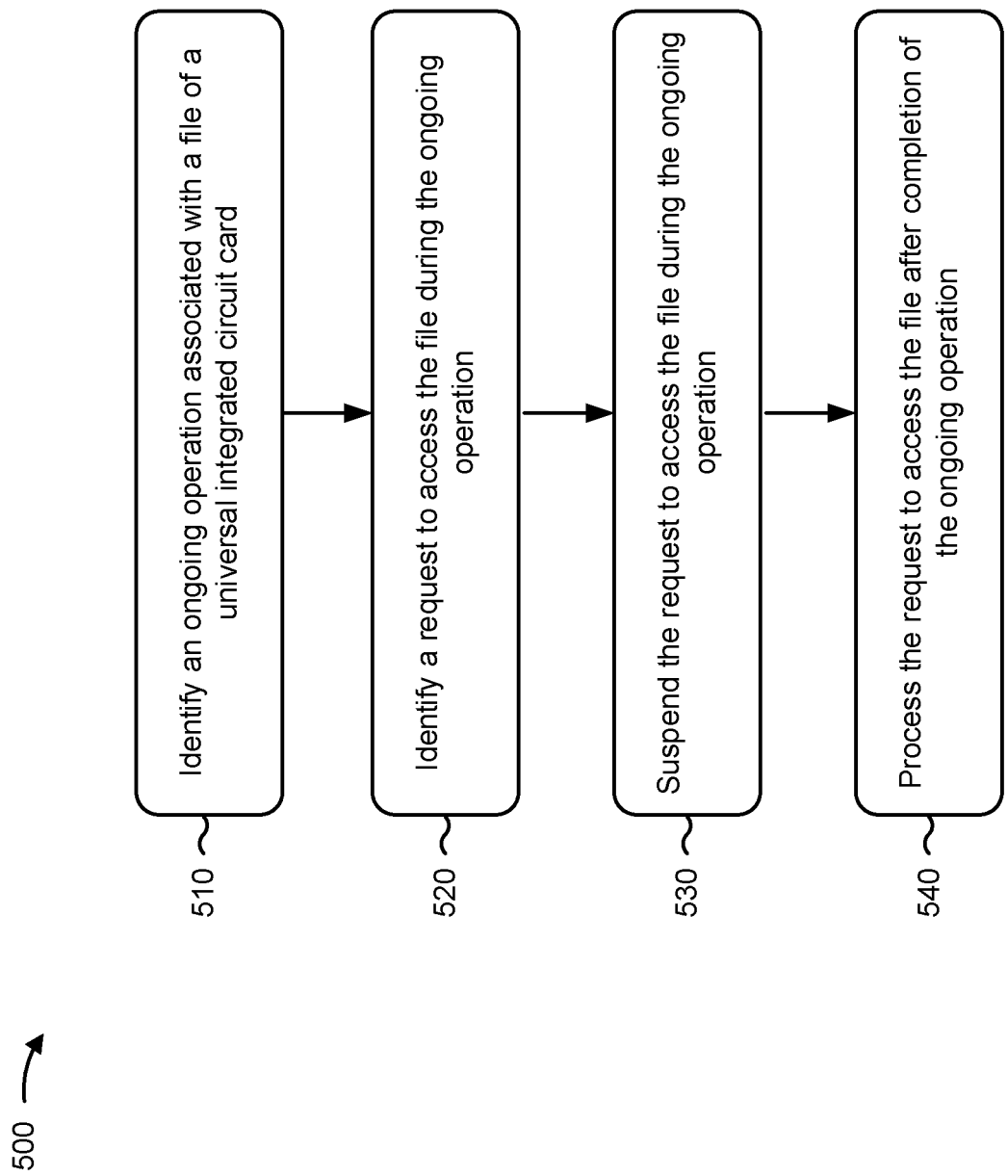
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120 and/or the like) performs operations associated with managing concurrent access to a UICC.

As shown in FIG. 5, in some aspects, process 500 may include identifying an ongoing operation associated with a file of a UICC coupled to the UE (block 510). For example, the UE (e.g., using controller/processor 280 and/or the like) may identify an ongoing operation associated with a file of a UICC coupled to the UE, as described above.

As further shown in FIG. 5, in some aspects, process 500 may include identifying a request to access the file during the ongoing operation (block 520). For example, the UE (e.g., using controller/processor 280 and/or the like) may identify a request to access the file during the ongoing operation, as described above.

As further shown in FIG. 5, in some aspects, process 500 may include suspending the request to access the file during the ongoing operation (block 530). For example, the UE (e.g., using controller/processor 280, memory 282, and/or the like) may suspend the request to access the file during the ongoing operation, as described above.

As further shown in FIG. 5, in some aspects, process 500 may include processing the request to access the file after completion of the ongoing operation (block 540). For example, the UE (e.g., using controller/processor 280 and/or the like) may process the request to access the file after completion of the ongoing operation, as described above.

Process 500 may include additional aspects, such as any single aspect or any combination of aspects described below and/or in connection with one or more other processes described elsewhere herein.

In a first aspect, the request to access the file includes a request to read the file during the ongoing operation, and suspending the request includes queueing the request to read the file. In a second aspect, alone or in combination with the first aspect, the request to access the file includes a request to write to the file during the ongoing operation, and suspending the request includes denying the request to write to the file without processing the request to write to the file.

In a third aspect, alone or in combination with one or more of the first and second aspects, the ongoing operation is an update operation of the UICC.

In a fourth aspect, alone or in combination with one or more of the first through third aspects, the request to access the file is processed after a time interval following the completion of the ongoing operation.

In a fifth aspect, alone or in combination with one or more of the first through fourth aspects, the ongoing operation is part of an envelope(SMS-PP) procedure, and completion of the ongoing operation is completion of the envelope(SMS-PP) procedure. In a sixth aspect, alone or in combination with one or more of the first through fifth aspects, the ongoing operation is part of a BIP session, and completion of the ongoing operation is completion of the BIP session.

In a seventh aspect, alone or in combination with one or more of the first through sixth aspects, the request to access the file originated from a process executing on the UE.

In an eighth aspect, alone or in combination with one or more of the first through seventh aspects, process 500 further includes identifying a refresh procedure that has been initiated on the UICC after the completion of the ongoing operation, identifying a request to access another file during the refresh procedure, and processing the request to access the other file during the refresh procedure based at least in part on a determination that the other file is not included in the refresh procedure.

In a ninth aspect, alone or in combination with one or more of the first through eighth aspects, process 500 further includes identifying a refresh procedure that has been initiated on the UICC after the completion of the ongoing operation, identifying a request to access the file during the refresh procedure, suspending the request to access the file during the refresh procedure based at least in part on a determination that the file is included in the refresh procedure, and processing the request to access the file after completion of the refresh procedure.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
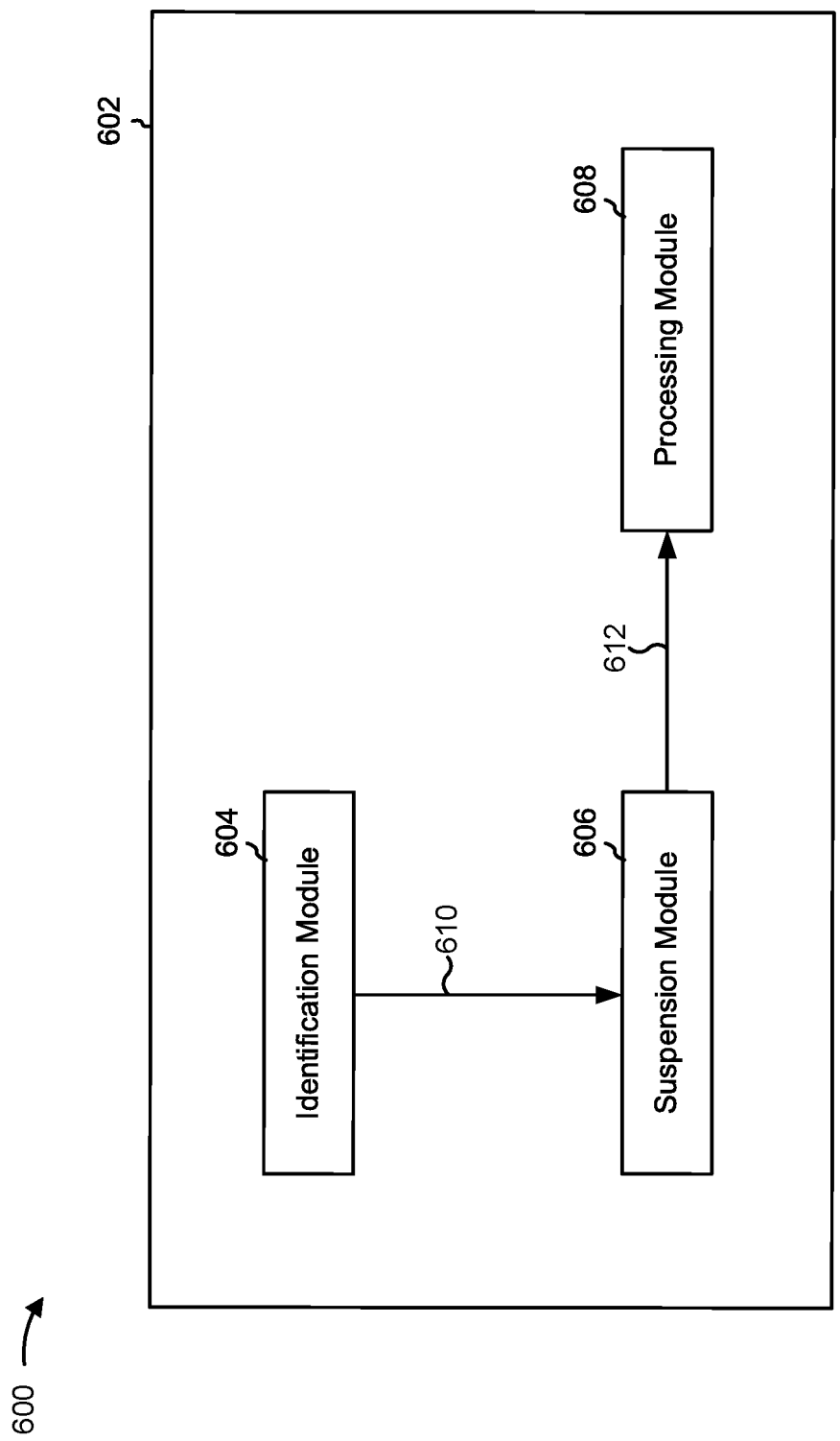
FIG. 6 is a conceptual data flow diagram illustrating an example of a data flow between different modules/means/components in an example apparatus.

FIG. 6 is a conceptual data flow diagram 600 illustrating the data flow between different modules/means/components in an example apparatus 602. The apparatus 602 may be a UE, such as UE 120, and/or the like. In some aspects, the apparatus 602 includes an identification module 604, a suspension module 606, and/or a processing module 608.

In some aspects, the identification module 604 may identify an ongoing operation associated with a file of a UICC. For example, the identification module 604 may identify an ongoing operation associated with a file of a UICC as described above in connection with FIGS. 3-5. In some aspects, the identification module 604 may identify a request to access the file during the ongoing operation. For example, the identification module 604 may identify a request to access the file during the ongoing operation as described above in connection with FIGS. 3-5.

In some aspects, the identification module 604 may provide information identifying the request to access the file to the suspension module 606 as data 610. In some aspects, the suspension module 606 may suspend the request to access the file during the ongoing operation. For example, the suspension module 606 may suspend the request to access the file during the ongoing operation as described above in connection with FIGS. 3-5.

In some aspects, the suspension module 606 may provide information identifying the request to the processing module 608 as data 612. In some aspects, the processing module 608 may process the request to access the file after completion of the ongoing operation. For example, the processing module 608 may process the request to access the file after completion of the ongoing operation as described above in connection with FIGS. 3-5.

In some aspects, apparatus 602 may include additional modules that perform each of the blocks of the algorithm in the aforementioned flow chart of FIG. 5. As such, each block in the aforementioned flow chart of FIG. 5 may be performed by a module and apparatus 602 may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 6 are provided as an example. In practice, there may be additional modules, fewer modules, different modules, or differently arranged modules than those shown in FIG. 6. Furthermore, two or more modules shown in FIG. 6 may be implemented within a single module, or a single module shown in FIG. 6 may be implemented as multiple, distributed modules. Additionally, or alternatively, a set of modules (e.g., one or more modules) shown in FIG. 6 may perform one or more functions described as being performed by another set of modules shown in FIG. 6.

Figure 7:
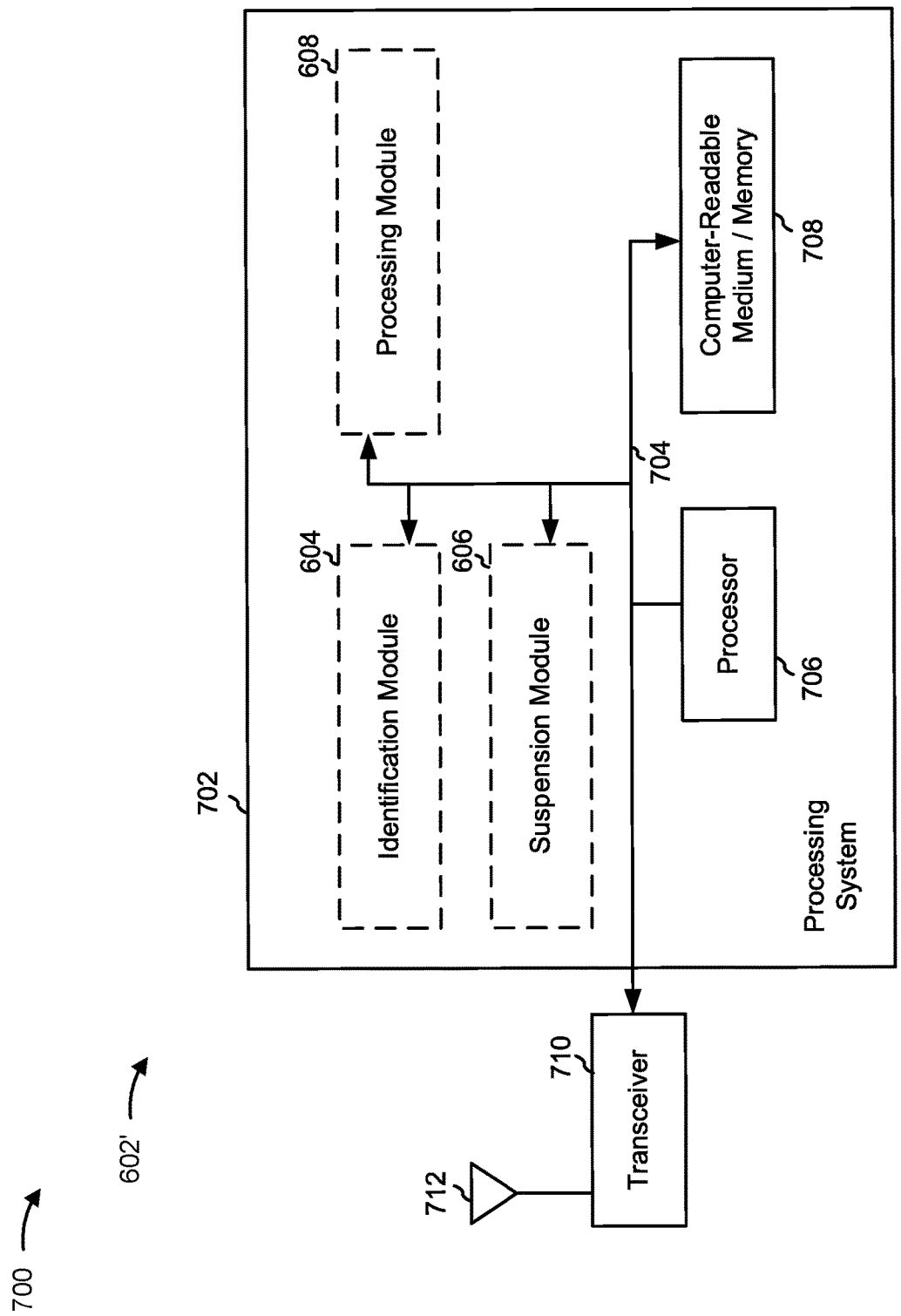
FIG. 7 is a diagram illustrating an example of a hardware implementation for an apparatus employing a processing system.

FIG. 7 is a diagram 700 illustrating an example of a hardware implementation for an apparatus 602' employing a processing system 702. The apparatus 602' may be a UE, such as UE 120, and/or the like.

The processing system 702 may be implemented with a bus architecture, represented generally by the bus 704. The bus 704 may include any number of interconnecting buses and bridges depending on the specific application of the processing system 702 and the overall design constraints. The bus 704 links together various circuits including one or more processors and/or hardware modules, represented by the processor 706, the modules 604, 606, 608, and the computer-readable medium/memory 708. The bus 704 may also link various other circuits such as timing sources, peripherals, voltage regulators, and power management circuits, which are well known in the art, and therefore, will not be described any further.

The processing system 702 may be coupled to a transceiver 710. The transceiver 710 is coupled to one or more antennas 712. The transceiver 710 provides a means for communicating with various other apparatus over a transmission medium. The transceiver 710 receives a signal from the one or more antennas 712, extracts information from the received signal, and provides the extracted information to the processing system 702, specifically the identification module 604. In addition, the transceiver 710 receives information from the processing system 702, specifically the processing module 608, and based at least in part on the received information, generates a signal to be applied to the one or more antennas 712. The processing system 702 includes a processor 706 coupled to a computer-readable medium/memory 708. The processor 706 is responsible for general processing, including the execution of software stored on the computer-readable medium/memory 708. The software, when executed by the processor 706, causes the processing system 702 to perform the various functions described supra for any particular apparatus. The computer-readable medium/memory 708 may also be used for storing data that is manipulated by the processor 706 when executing software. The processing system further includes at least one of the modules 604, 606, and 608. The modules may be software modules running in the processor 706, resident/stored in the computer-readable medium/memory 708, one or more hardware modules coupled to the processor 706, or some combination thereof. The processing system 702 may be a component of the UE 120 and may include the memory 282 and/or at least one of the transmit processor 264, the TX MIMO processor 266, the MIMO detector 256, the receive processor 258, and/or the controller/processor 280.

In some aspects, the apparatus 602/602' for wireless communication includes means for identifying an ongoing operation associated with a file of a UICC coupled to the apparatus 602/602', means for identifying a request to access the file during the ongoing operation, means for suspending the request to access the file during the ongoing operation, means for processing the request to access the file after completion of the ongoing operation, and/or the like. The aforementioned means may be one or more of the aforementioned modules of the apparatus 602 and/or the processing system 702 of the apparatus 602' configured to perform the functions recited by the aforementioned means. As described supra, the processing system 702 may include the transmit processor 264, the TX MIMO processor 266, the MIMO detector 256, the receive processor 258, and/or the controller/processor 280. As such, in one configuration, the aforementioned means may be the transmit processor 264, the TX MIMO processor 266, the MIMO detector 256, the receive processor 258, and/or the controller/processor 280 configured to perform the functions recited by the aforementioned means.

FIG. 7 is provided as an example. Other examples are possible and may differ from what was described in connection with FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    identifying an ongoing operation associated with a file of a universal integrated circuit card (UICC) coupled to the UE;
    identifying a request to access the file during the ongoing operation;
    suspending the request to access the file during the ongoing operation;
    initiating a refresh procedure after completion of the ongoing operation;
    determining that the refresh procedure has not concluded after expiration of a timer;
    restarting, prior to processing the request to access the file, the timer based on determining that the refresh procedure has not concluded; and
    processing the request to access the file after completion of the ongoing operation.

2. The method of claim 1, wherein the request to access the file includes a request to read the file during the ongoing operation, and wherein suspending the request includes queueing the request to read the file.

3. The method of claim 1, wherein the request to access the file includes a request to write to the file during the ongoing operation, and
wherein suspending the request includes denying the request to write to the file without processing the request to write to the file.

4. The method of claim 1, wherein the ongoing operation is an update operation of the UICC.

5. The method of claim 1, wherein the request to access the file is processed after a time interval following the completion of the ongoing operation.

6. The method of claim 1, wherein the ongoing operation is part of an envelope (short message service-point-to-point (SMS-PP)) procedure, and
wherein the completion of the ongoing operation is completion of the envelope(SMS-PP) procedure.

7. The method of claim 1, wherein the ongoing operation is part of a bearer independent protocol (BIP) session, and
wherein the completion of the ongoing operation is completion of the BIP session.

8. The method of claim 1, wherein the request to access the file originated from a process executing on the UE.

9. The method of claim 1, further comprising:
identifying another request to access another file during the refresh procedure; and
processing the other request to access the other file during the refresh procedure based at least in part on a determination that the other file is not included in the refresh procedure.

10. The method of claim 1, further comprising:
identifying another request to access the file during the refresh procedure;
suspending the other request to access the file during the refresh procedure based at least in part on a determination that the file is included in the refresh procedure; and
processing the other request to access the file after completion of the refresh procedure.

11. The method of claim 1, further comprising:
initiating the timer after completion of the ongoing operation.

12. The method of claim 1, wherein the refresh procedure is a file change notification procedure.

13. A user equipment (UE) for wireless communication, comprising:
a memory; and
one or more processors operatively coupled to the memory, the memory and the one or more processors configured to:
identify an ongoing operation associated with a file of a universal integrated circuit card (UICC) coupled to the UE;
identify a request to access the file during the ongoing operation;
suspend the request to access the file during the ongoing operation;
initiate a refresh procedure after completion of the ongoing operation;
determine that the refresh procedure has not concluded after expiration of a timer;
restart, prior to processing the request to access the file, the timer based on determining that the refresh procedure has not concluded; and
process the request to access the file after completion of the ongoing operation.

14. The UE of claim 13, wherein the request to access the file includes a request to read the file during the ongoing operation, and
wherein suspending the request includes queueing the request to read the file.

15. The UE of claim 13, wherein the request to access the file includes a request to write to the file during the ongoing operation, and
wherein suspending the request includes denying the request to write to the file without processing the request to write to the file.

16. The UE of claim 13, wherein the ongoing operation is an update operation of the UICC.

17. The UE of claim 13, wherein the request to access the file is processed after a time interval following the completion of the ongoing operation.

18. The UE of claim 13, wherein the ongoing operation is part of an envelope(short message service-point-to-point (SMS-PP)) procedure, and
wherein the completion of the ongoing operation is completion of the envelope(SMS-PP) procedure.

19. The UE of claim 13, wherein the ongoing operation is part of a bearer independent protocol (BIP) session, and
wherein the completion of the ongoing operation is completion of the BIP session.

20. The UE of claim 13, wherein the request to access the file originated from a process executing on the UE.

21. The UE of claim 13, wherein the one or more processors are further configured to:
identify another request to access another file during the refresh procedure; and
process the other request to access the other file during the refresh procedure based at least in part on a determination that the other file is not included in the refresh procedure.

22. The UE of claim 13, wherein the one or more processors are further configured to:
identify another request to access the file during the refresh procedure;
suspend the other request to access the file during the refresh procedure based at least in part on a determination that the file is included in the refresh procedure; and
process the other request to access the file after completion of the refresh procedure.

23. A non-transitory computer-readable medium storing one or more instructions for wireless communication, the one or more instructions comprising:
one or more instructions that, when executed by one or more processors of a user equipment (UE), cause the one or more processors to:
identify an ongoing operation associated with a file of a universal integrated circuit card (UICC) coupled to the UE;
identify a request to access the file during the ongoing operation;
suspend the request to access the file during the ongoing operation; and
initiate a refresh procedure after completion of the ongoing operation;
determine that the refresh procedure has not concluded after expiration of a timer;
restart, prior to processing the request to access the file, the timer based on determining that the refresh procedure has not concluded; and
process the request to access the file after completion of the ongoing operation.

24. The non-transitory computer-readable medium of claim 23, wherein the request to access the file includes a request to read the file during the ongoing operation, and
   wherein suspending the request includes queueing the request to read the file.

25. The non-transitory computer-readable medium of claim 23, wherein the request to access the file includes a request to write to the file during the ongoing operation, and
   wherein suspending the request includes denying the request to write to the file without processing the request to write to the file.

26. The non-transitory computer-readable medium of claim 23, wherein the ongoing operation is an update operation of the U ICC.

27. The non-transitory computer-readable medium of claim 23, wherein the request to access the file is processed after a time interval following the completion of the ongoing operation.

28. The non-transitory computer-readable medium of claim 23, wherein the ongoing operation is part of an envelope(short message service-point-to-point (SMS-PP)) procedure, and
   wherein the completion of the ongoing operation is completion of the envelope(SMS-PP) procedure.

29. The non-transitory computer-readable medium of claim 23, wherein the ongoing operation is part of a bearer independent protocol (BIP) session, and
   wherein the completion of the ongoing operation is completion of the BIP session.

30. The non-transitory computer-readable medium of claim 23, wherein the one or more instructions, when executed by the one or more processors, further cause the one or more processors to:
   identify another request to access another file during the refresh procedure; and
   process the other request to access the other file during the refresh procedure based at least in part on a determination that the other file is not included in the refresh procedure.

31. The non-transitory computer-readable medium of claim 23, wherein the one or more instructions, when executed by the one or more processors, further cause the one or more processors to:
   identify another request to access the file during the refresh procedure;
   suspend the other request to access the file during the refresh procedure based at least in part on a determination that the file is included in the refresh procedure; and
   process the other request to access the file after completion of the refresh procedure.

32. An apparatus for wireless communication, comprising:
   means for identifying an ongoing operation associated with a file of a universal integrated circuit card (UICC) coupled to the apparatus;
   means for identifying a request to access the file during the ongoing operation;
   means for suspending the request to access the file during the ongoing operation;
   means for initiating a refresh procedure after completion of the ongoing operation;
   means for determining that the refresh procedure has not concluded after expiration of a timer;
   means for restarting, prior to processing the request to access the file, the timer based on determining that the refresh procedure has not concluded; and
   means for processing the request to access the file after completion of the ongoing operation.

* * * * *